United States Patent [19]
Brown et al.

[11] Patent Number: 5,520,571
[45] Date of Patent: May 28, 1996

[54] SYSTEM AND METHOD OF REMOVING CONTAMINANTS FROM SOLID SURFACES AND DECONTAMINATING WASTE

[75] Inventors: Terry L. Brown, Fayetteville; Anthony J. Geiss, Liverpool; Scott Grieco, Skaneateles; Eric D. Neubauer, East Syracuse; James R. Rhea, Baldwinsville, all of N.Y.

[73] Assignee: O'Brien & Gere Technical Services, Inc., Syracuse, N.Y.

[21] Appl. No.: 386,101

[22] Filed: Feb. 9, 1995

Related U.S. Application Data

[62] Division of Ser. No. 272,054, Jul. 8, 1994, Pat. No. 5,457,261.

[51] Int. Cl.⁶ ........................................... B24C 9/00
[52] U.S. Cl. .................... 451/88; 451/38; 134/6; 134/7; 134/13; 134/12
[58] Field of Search ...................... 451/87, 88, 75, 451/38, 39, 40; 134/6, 7, 12, 13

[56] References Cited

U.S. PATENT DOCUMENTS

| | | | |
|---|---|---|---|
| 3,895,465 | 7/1975 | Korn et al. | 451/88 |
| 4,800,063 | 1/1989 | Mierswa et al. | 51/321 |
| 4,965,968 | 10/1990 | Kelsall | 51/410 |
| 5,160,547 | 11/1992 | Kirschner et al. | 134/7 |
| 5,290,364 | 3/1994 | Stein et al. | 134/7 |
| 5,302,324 | 4/1994 | Morikawa et al. | 252/626 |
| 5,316,587 | 5/1994 | Yam et al. | 51/304 |
| 5,322,532 | 6/1994 | Kurtz | 51/293 |
| 5,322,644 | 6/1994 | Dunn et al. | 252/626 |
| 5,401,204 | 3/1995 | Shank | 451/39 |

*Primary Examiner*—Bruce M. Kisliuk
*Assistant Examiner*—Eileen P. Morgan
*Attorney, Agent, or Firm*—Charles S. McGuire

[57] ABSTRACT

A method and system for removing a surface layer contaminated with radioactive and/or hazardous material and subsequently treating the waste to remove contaminants and provide an essentially contaminant-free final effluent. The contaminated material is removed by blasting the surface with a pressurized stream of air and sodium bicarbonate abrasive media, and the media is dissolved in water subsequent to the blasing operation. The resulting waste is treated in a sequence of steps including adjustment of pH, aeration and separation into primarily solid and liquid phases by precipitation of solids, which are removed for appropriate disposal. The primarily liquid phase is successively passed through a particle filter, a granulated activated carbon filter and a polishing unit to produce the clean final effluent.

15 Claims, 1 Drawing Sheet

5,520,571

SYSTEM AND METHOD OF REMOVING CONTAMINANTS FROM SOLID SURFACES AND DECONTAMINATING WASTE

This is a divisional application of Ser. No. 08/272,054, filed Jul. 8, 1994 now U.S. Pat. No. 5,457,261.

BACKGROUND OF THE INVENTION

The present invention relates to systems and methods for removing radioactive and/or hazardous materials from steel, concrete, or other solid surfaces and thereafter treating the generated waste to render a significant portion thereof essentially free of contaminants, and disposing of the reduced volume of contaminated waste. More specifically, the invention relates to systems and methods wherein a pressurized mixture of sodium bicarbonate and air is ejected from a nozzle and directed in a concentrated spray upon a contaminated surface, with water being added at the nozzle during blasting as required to control dust. Water is added after the blasting to dissolve the spent sodium bicarbonate, and the waste material is treated to remove a significant portion of the contaminated solids, the resulting liquid phase being further treated for removal of contaminants to produce an essentially contaminant-free final effluent.

Various surfaces which are contacted by radioactive, toxic and/or other hazardous materials within industrial facilities, and the like, must periodically be decontaminated in order to permit inspection and/or repair, as well as reuse, recycling or sale of the building or equipment incorporating such surfaces. Among the more common procedures employed to effect such decontamination is that of abrasive blasting. Abrasive media used for surface decontamination have included sand, black beauty (coal slag) and steel shot, as well as liquid or solid carbon dioxide. The use of materials which remain in a solid state after impinging upon and removing contaminants from the treated surface requires costly handling and disposal of a large volume of contaminated waste. Media which is in, or converts to, the gaseous state is difficult to contain and decontaminate.

It is a principal object of the present invention to provide a method and system employing a number of otherwise conventional elements of apparatus in novel sequence and combination to effect significant reduction in the volume of contaminated solid waste generated in decontamination of solid surfaces by abrasive blasting.

Another object is to provide a novel and improved method and system of removing radioactive or hazardous material from a solid surface by abrasive blasting which reduces the cost of disposal of contaminated waste.

A further object is to provide a method and system for removal of contaminants from solid surface by abrasive blasting utilizing water soluble, low cost, readily available blasting media, namely, sodium bicarbonate.

Other objects will in part be obvious and will in part appear hereinafter.

SUMMARY OF THE INVENTION

The decontamination method and system of the invention may be conveniently separated into two components, namely a blasting and a treatment method and system. The two components are, of course, related and carried out successively. The surface which is initially contaminated is contacted by a high-pressure, air-borne stream of sodium bicarbonate, or a commercial abrasive blasting medium containing or consisting of sodium bicarbonate. A water spray may also be directed upon the surface for dust suppression; in any case, sufficient water is mixed with the resulting waste to dissolve the sodium bicarbonate following the blasting operation.

Contaminated material is removed from the surface by the spray from the blast nozzle. When sufficient material has been removed to render the surface essentially free of contaminants, rinse water is directed upon the surface to ensure that all contaminated material and spent blast media is removed. The waste, consisting of the spent abrasive media and water, as well as the material removed from the surface, is subjected to the treatment phase.

The waste is first collected in an equalization tank where it is mixed with water to ensure that the sodium bicarbonate is thoroughly dissolved, and acid is added to adjust the pH to about 5 s.u. The waste then flows to an aeration tank where it is aerated to liberate carbonate as carbon dioxide gas. In the next tank, caustic chemicals are added to elevate the pH to a value adequate for solids precipitation. Chemical coagulants and/or flocculants are added, if necessary, prior to flow of the treated waste into a clarification tank for precipitation of contaminated solids. The precipitated solids, constituting a high percentage of all solids initially contained in the waste stream, are removed from the clarification tank and suitably packaged for disposal, after further reduction of solids volume by additional liquid removal, if desired.

Liquid waste from the tank is passed successively through one or more particle filters for removal of residual macrosolids, and a granulated activated carbon (GAC) filter for removal of organic contaminants. The liquid waste is then subjected to polishing for dissolved radioactive ion and heavy metal removal. The final effluent is essentially free of all contaminants and acid may be added to adjust pH prior to recycling or other disposition.

The foregoing and other features of the invention will be more readily understood and fully appreciated from the following detailed description, taken in conjunction with the accompanying drawing.

BRIEF DESCRIPTION OF THE DRAWING

The single FIGURE is a diagrammatic representation of the blasting and treatment system, also illustrating the steps in the method of the invention.

DETAILED DESCRIPTION

Figure 1:
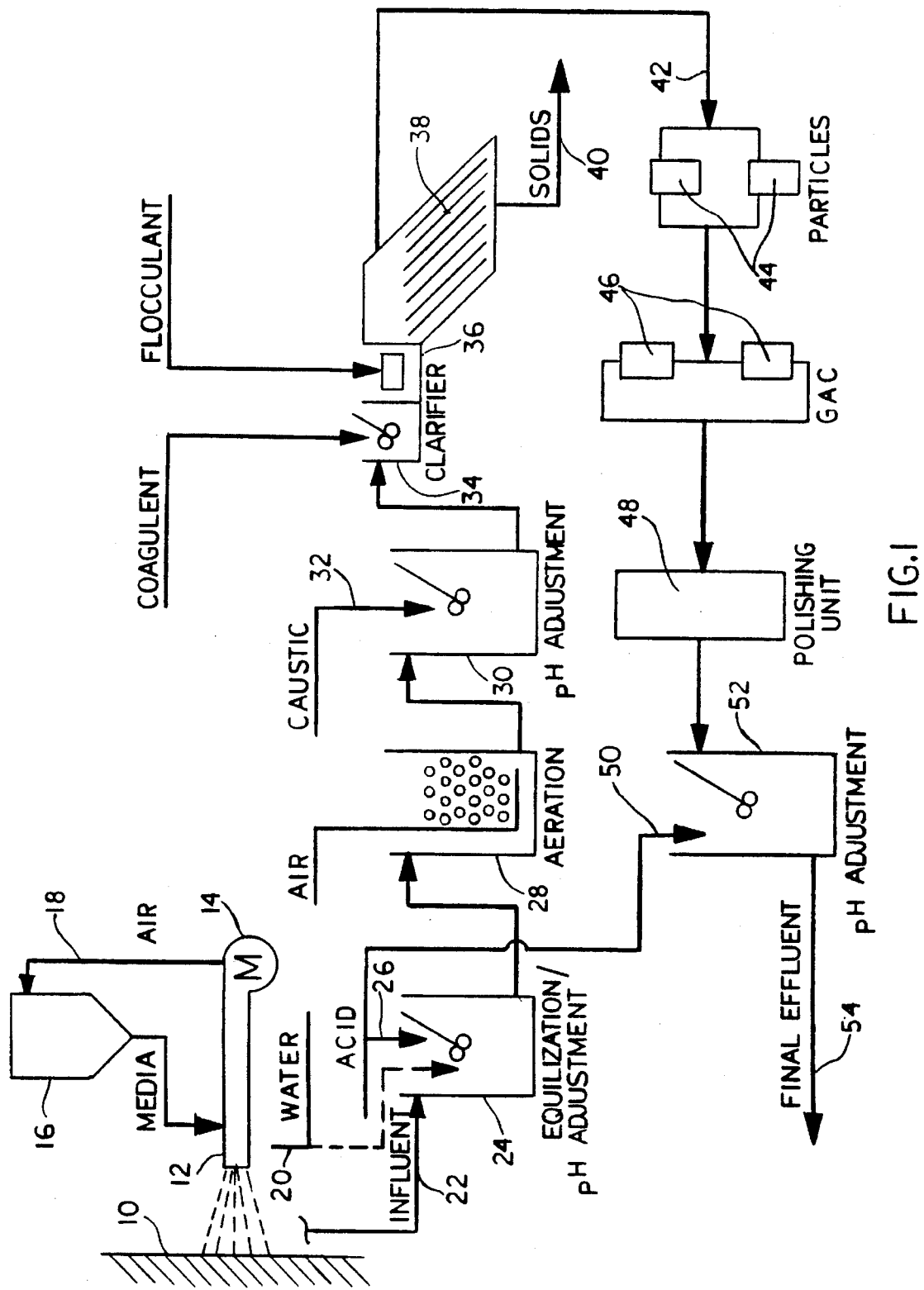

Referring now to the drawings, a surface of concrete, steel, or the like, is indicated by reference numeral 10. Surface contamination, such as PCBs and radioactive wastes, must be removed from surface 10 in order that the building or equipment of which surface 10 is a part may be inspected, repaired, used, recycled or sold. Decontamination is effected by removal of material from surface 10 with spray from blasting nozzle 12 directed upon surface 10.

Pressurized air is supplied to nozzle 12 from compressed air source 14. The air supply is also connected to media pot 16 via line 18. Pot 16 contains a supply of sodium bicarbonate-based abrasive blasting media such as that available from the assignee hereof, as well as other commercial sources. Such products may include, in addition to relatively coarse sodium bicarbonate abrasive, flow enhancers and other ingredients. The pressurized air supplied to pot 16 is at a pressure slightly higher than the air pressure in nozzle 12 to ensure a supply of blasting media to nozzle 12 at a desired rate. Suitable pressure regulators, gauges, valves and controls (not shown) are provided in accordance with conventional practice. Water is supplied from an appropriate source through line 20 and mixed with the air-media stream internally or externally of nozzle 16, which may be of any standard commercial design appropriate to the described application, for dust suppression during the blasting operation.

Compressed air is preferably delivered to nozzle 12 at a pressure of 80–100 psi and a rate of 250–300 cfm. Media of the aforementioned type is provided at a rate of 1.0–2.5 pounds per minute. Water usage is in the range of about 0.3–0.9 gallons per minute. Following blasting with the air-media-water stream, surface 10 is rinsed with 0.75–1.0 gallons of water per pound of media used. The aforementioned sodium bicarbonate-based blasting media is preferred due to its water solubility, relatively low cost and ready availability.

Waste from the blasting process, including all water, blasting media and material removed from surface 10, is collected and deposited via line 22 in equalization tank 24, serving to balance flow rates of the waste between the blasting and treatment operations. If the quantity of water from the blasting operation is not sufficient to dissolve all of the sodium bicarbonate media, further water may be added for such purpose in tank 24. Sulfuric or other appropriate acid is added via line 26 to adjust the pH of the waste in tank 24 to a value of about 5 s.u. Waste from equalization tank 24 is deposited in aeration tank 26 where air from source 14, or from a separate source, is released within the waste to accelerate liberation of carbon dioxide gas formed from the carbonates in the solution.

From aeration tank 26 the waste is deposited in tank 28 where caustic material is added, as indicated at 30 to elevate the pH to a level suitable for precipitation of solids from the waste. Depending upon the nature of the solids in the waste, coagulating and/or flocculating agents may be added to the waste in one or both of tanks 34 and 36. Such chemicals are selected for their ability to cause the solids in the waste to precipitate out of the liquid phase and may not be required in some applications, e.g., when the solids are largely cement powder. Solid contaminants are removed from clarifier 38 through line 40 and may be further de-watered for volume reduction before being containerized for appropriate disposal in accordance with the nature and level of contamination.

The remaining waste, typically having a water content of more than 95%, is delivered from clarifier 38 through line 42 to particle filters 44. After passing through particle filters 44, wherein additional contaminated macro-solids are removed, the waste is passed through a granulated activated charcoal (GAC) filter 46 which adsorbs organic contaminants. From GAC 46 the waste is subjected to a polishing operation in unit 48, such as an ion-exchange column.

Upon exiting polishing unit 48, the liquid effluent is essentially contaminant-free. Before recycling or other disposition of the final effluent, it may be desirable to adjust pH by addition of a suitable acidic solution through line 50 to the final effluent in tank 52. Particle filters 44 may comprise conventional paper media filter cartridges. GAC filter 46 and polishing unit 48 are also commercially available items, and the capacity and other characteristics thereof are chosen in accordance with the anticipated nature and volume of contaminants to be removed. The media of particle filters 44 and GAC 46 will, of course, require replacement from time to time, with proper handling and disposal of spent filtration media.

Among the advantages of the surface decontamination method and system of the invention is the low volume of solid contaminants requiring disposal, as compared to conventional systems. That is, the volume of solid contaminants removed from clarifier 38 may be not appreciably greater than the material actually removed from surface 10, whereas it is not unusual in prior art systems for the volume of contaminated solid waste to exceed fifty times that of the material removed from the initially contaminated surface. Final effluent through line 54 is suitable for discharge into uncontaminated municipal wastes or, if desired, for recycling to the blasting operation.

What is claimed is:

1. A system for removing toxic and/or radioactive contaminants from the surface of steel, concrete, or the like, and treating the waste generated by such removal in a manner resulting in a volume of contaminated solids which is significantly reduced from prior art decontamination systems and an essentially contaminant-free final effluent, said system comprising:

a) first means for directing a stream of sodium-bicarbonate based abrasive blasting media onto said surface at a velocity sufficient to remove a thin layer of material including said contaminants from said surface;

b) second means for contacting said media with a quantity of water sufficient to dissolve substantially all of said media;

c) third means for adjusting the pH of a first mixture, consisting essentially of said water, dissolved media and material removed from said surface, to a first value at which substantially all carbonates are in the form of carbon dioxide gas and water;

d) fourth means for removing said carbon dioxide gas from said first mixture to form a remaining, second mixture;

e) fifth means for adjusting the pH of said second mixture to a second value conducive to precipitation of solids, including substantially all of said contaminants, from said second mixture; and f) sixth means for separating said second mixture into primarily liquid and solid phases.

2. The system of claim 1 wherein said first value is not greater than about 5 s.u.

3. The system of claim 1 wherein said first means comprises a blasting nozzle having an internal chamber, an outlet and means for introducing pressurized air and said blasting media into said chamber for emission of a pressurized stream of said media from said outlet.

4. The system of claim 3 wherein said second means comprises means for directing at least a portion of said quantity of water onto said surface.

5. The system of claim 4 wherein said third means comprises means for adding an appropriate acid to said first mixture.

6. The system of claim 5 wherein said acid is sulfuric acid.

7. The system of claim 5 wherein said fourth means comprises means for aerating said first mixture to blow off said carbon dioxide gas.

8. The system of claim 7 wherein said fifth means comprises means for adding an appropriate caustic material to said second mixture.

9. The system of claim 8 wherein said sixth means comprises means for adding appropriate coagulating and/or flocculating agents to said second mixture.

10. The system of claim 8 wherein said sixth means comprises a clarifier.

11. The system of claim 10 and further including means for further de-watering said primarily solid phase after removal from said clarifier.

12. The system of claim 10 and further including particle filter means for filtering particulates from said primarily liquid phase after removal from said clarifier.

13. The system of claim 12 and further including GAC filter means for absorption of organic contaminants from said primarily liquid phase.

14. The system of claim 13 and further including a polishing unit through which said primarily liquid phase is passed to provide an essentially contaminant-free effluent.

15. The system of claim 14 and further including means for adjusting the pH of said final effluent.

* * * * *